US012576428B2

(12) United States Patent
Cho et al.

(10) Patent No.: US 12,576,428 B2
(45) Date of Patent: Mar. 17, 2026

(54) METHOD FOR MANUFACTURING OMNIPHOBIC SURFACE USING CAPILLARY FORCE

(71) Applicant: CHANGWON NATIONAL UNIVERSITY INDUSTRY ACADEMY COOPERATION CORPS, Changwon-si (KR)

(72) Inventors: Young Tae Cho, Changwon-si (KR); Seok Kim, Changwon-si (KR); Su Hyun Choi, Changwon-si (KR)

(73) Assignee: CHANGWON NATIONAL UNIVERSITY INDUSTRY ACADEMY COOPERATION CORPS, Changwon-si (KR)

( * ) Notice: Subject to any disclaimer, the term of this patent is extended or adjusted under 35 U.S.C. 154(b) by 0 days.

(21) Appl. No.: 18/758,422

(22) Filed: Jun. 28, 2024

(65) Prior Publication Data

US 2024/0351064 A1 Oct. 24, 2024

Related U.S. Application Data

(63) Continuation of application No. PCT/KR2022/011074, filed on Jul. 27, 2022.

(30) Foreign Application Priority Data

Dec. 31, 2021 (KR) ........................ 10-2021-0194271

(51) Int. Cl.
*B05D 3/06* (2006.01)
*B05D 1/26* (2006.01)
*B05D 1/28* (2006.01)

(52) U.S. Cl.
CPC ............... *B05D 3/067* (2013.01); *B05D 1/26* (2013.01); *B05D 1/28* (2013.01)

(58) Field of Classification Search
CPC ............. B05D 3/067; B05D 1/26; B05D 1/28
See application file for complete search history.

(56) References Cited

U.S. PATENT DOCUMENTS

2006/0249886 A1 11/2006 Chao et al.
2008/0067506 A1* 3/2008 Takei .................. H10K 59/122 257/40

(Continued)

FOREIGN PATENT DOCUMENTS

KR 10-2006-0016364 A 2/2006
KR 20060016364 A * 2/2006 .............. G03F 7/70

(Continued)

OTHER PUBLICATIONS

Seonjun Kim et al., "Effect of surface pattern morphology on inducing superhydrophobicity", Applied Surface Science, May 30, 2020, pp. 1-9, vol. 513, 145847.

(Continued)

*Primary Examiner* — Dah-Wei D. Yuan
*Assistant Examiner* — Kristen A Dagenais
(74) *Attorney, Agent, or Firm* — Sughrue Mion, PLLC

(57) ABSTRACT

The present invention relates to a method of manufacturing a micropattern surface with a reentrant structure with hydrophobicity and oleophobicity through a simple process using capillary force. The method of the present invention includes a step of forming a resin layer by applying an ultraviolet rays (UV) curable resin on a first substrate; a step of forming a pillar-shaped fine pattern on a second substrate; a step of bringing the resin layer and the fine pattern into contact with each other by moving the first substrate or the second substrate so that the resin layer and the fine pattern face each other; and a step of curing the resin by radiating ultraviolet rays while the resin located around a pillar of the fine pattern (Continued)

moves a certain distance along the pillar in the longitudinal direction of the pillar of the fine pattern by capillary force.

8 Claims, 16 Drawing Sheets

(56) References Cited

U.S. PATENT DOCUMENTS

| | | | | |
|---|---|---|---|---|
| 2014/0010970 | A1 | 1/2014 | Lee | |
| 2014/0084519 | A1 * | 3/2014 | Porro | B29C 37/0003 264/447 |
| 2017/0342276 | A1 * | 11/2017 | Wang | C09D 5/1668 |

FOREIGN PATENT DOCUMENTS

| | | | |
|---|---|---|---|
| KR | 10-2012-0071067 | A | 7/2012 |
| KR | 10-2013-0009213 | A | 1/2013 |
| KR | 10-2014-0004960 | A | 1/2014 |
| KR | 10-2014-0028677 | A | 3/2014 |
| KR | 10-2015-0126758 | A | 11/2015 |
| KR | 10-2019-0108748 | A | 9/2019 |
| KR | 10-2052100 | B1 | 12/2019 |

OTHER PUBLICATIONS

International Search Report for PCT/KR2022/011074 dated Nov. 7, 2022.

Extended European Search Report dated Dec. 3, 2025, issued in European application No. 22916263.1.

Jaekyoung Kim et al., "Robust Superomniphobic Micro-Hyperbola Structures Formed by Capillary Wrapping of a Photocurable Liquid around Micropillars", Advanced Functional Materials, 2021, vol. 31, No. 18 (9 pages).

R.A. Bond et al., "Macroelectronic photolithography: I -- the optimization of photoresist application by roller coating", Developments in Semiconductor Lithography V, 1980, SPIE vol. 221, pp. 74-83.

Jukka Viheriala et al., "Nanoimprint Lithography - Next Generation Nanopatternign Methods for Nanophotonics Fabrication", Recent Optical and Photonic Technologoes, InTech, 2010, pp. 275-298.

* cited by examiner

[FIG. 1A]
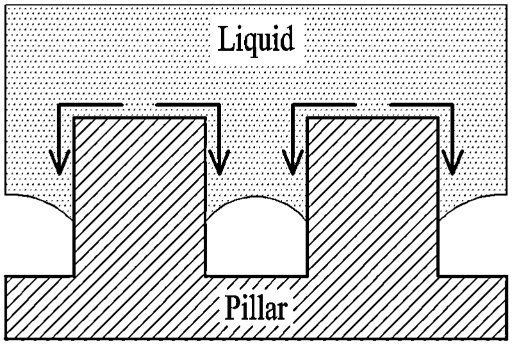
[FIG. 1B]
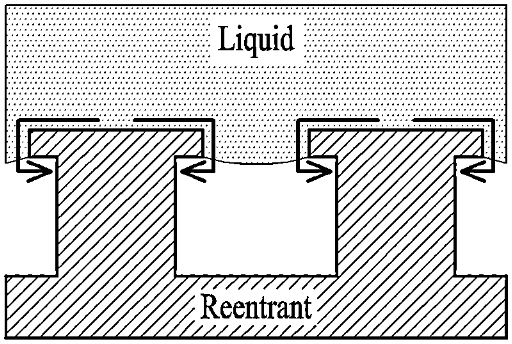
[FIG. 1C]
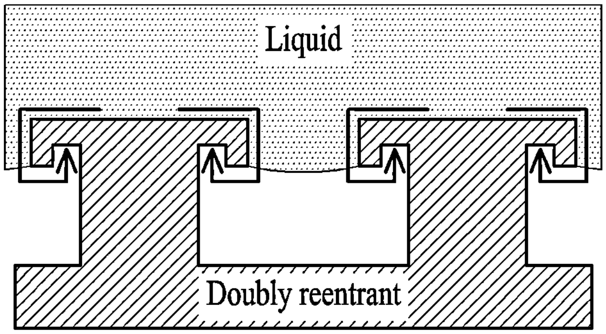

[FIG. 2]
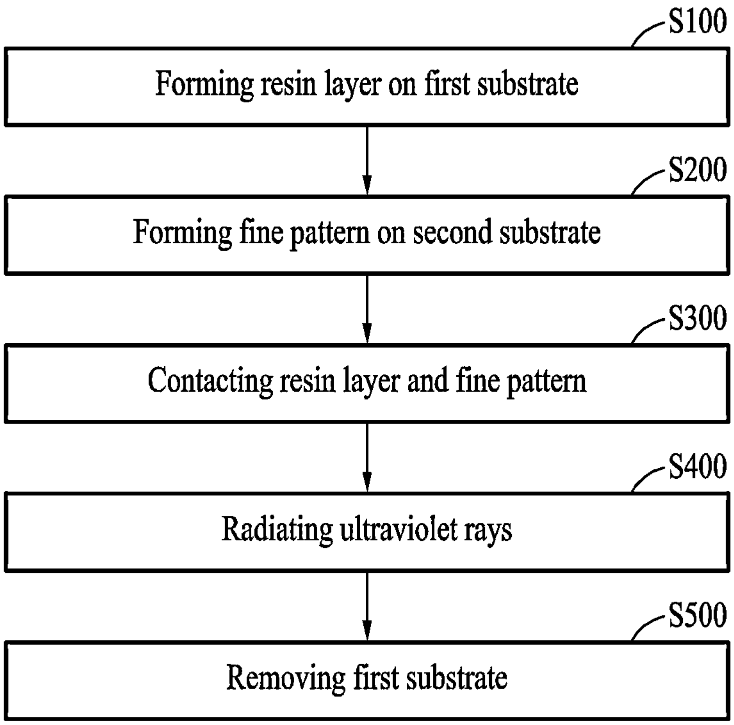

[FIG. 3A]
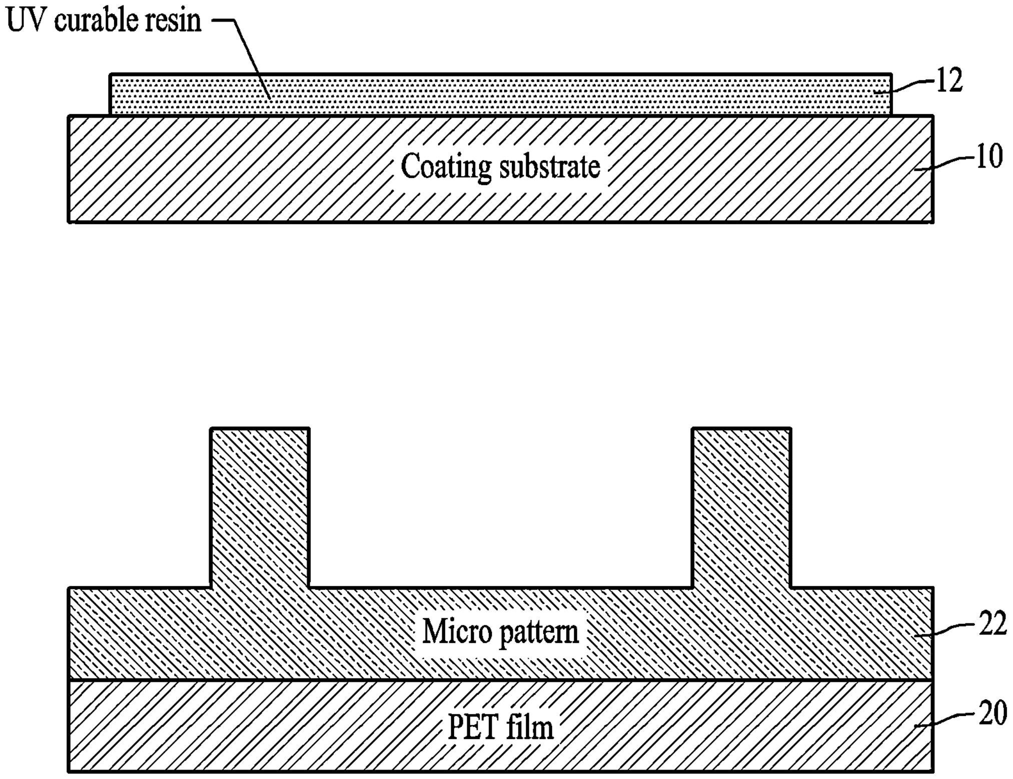

[FIG. 3B]
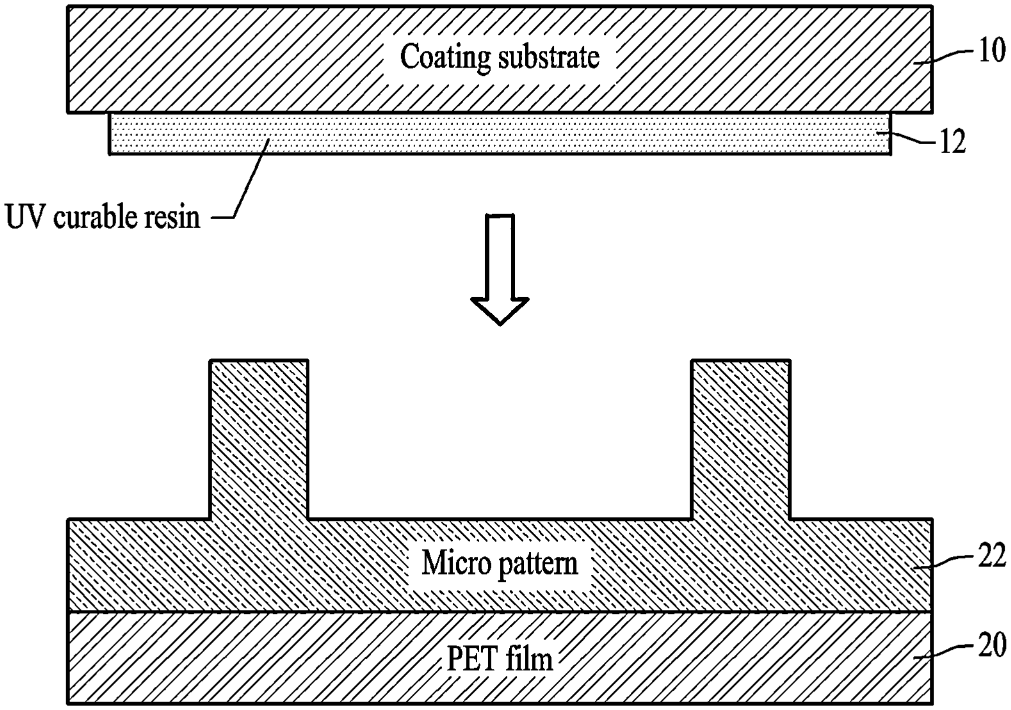

[FIG. 3C]
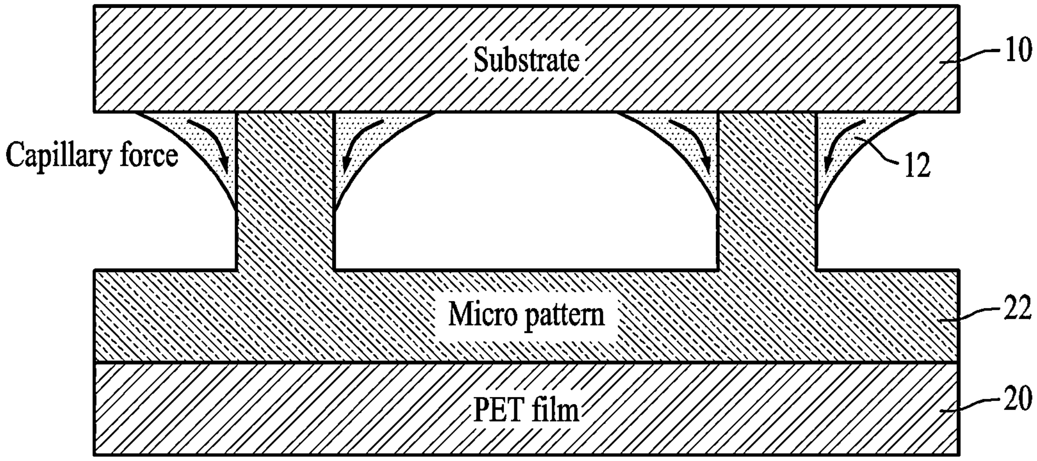

[FIG. 3D]
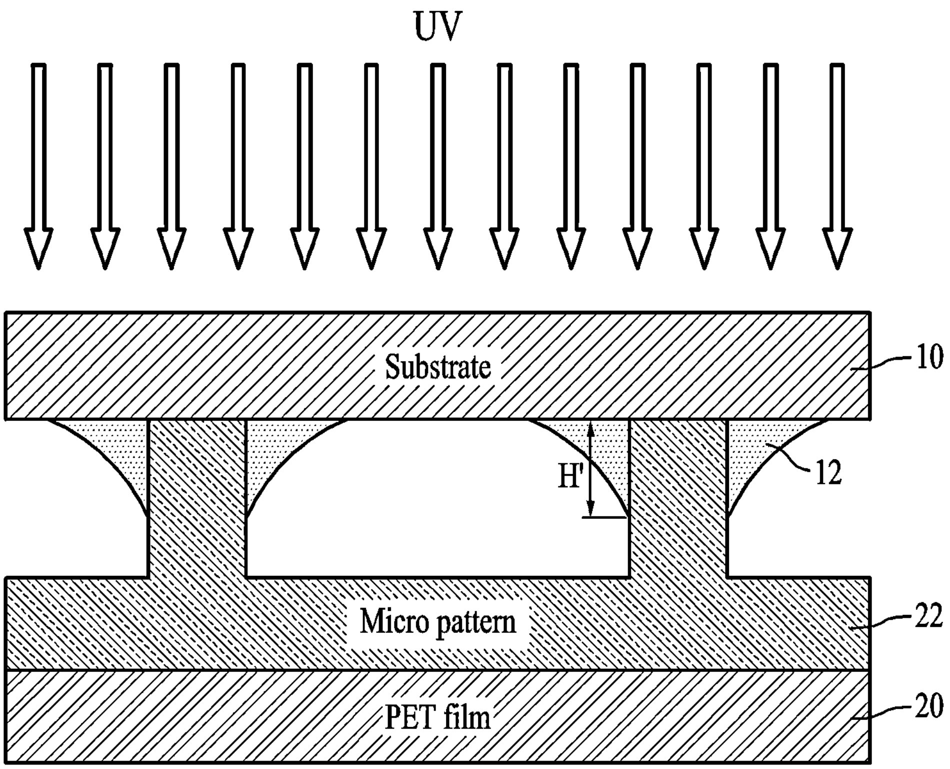

[FIG. 3E]
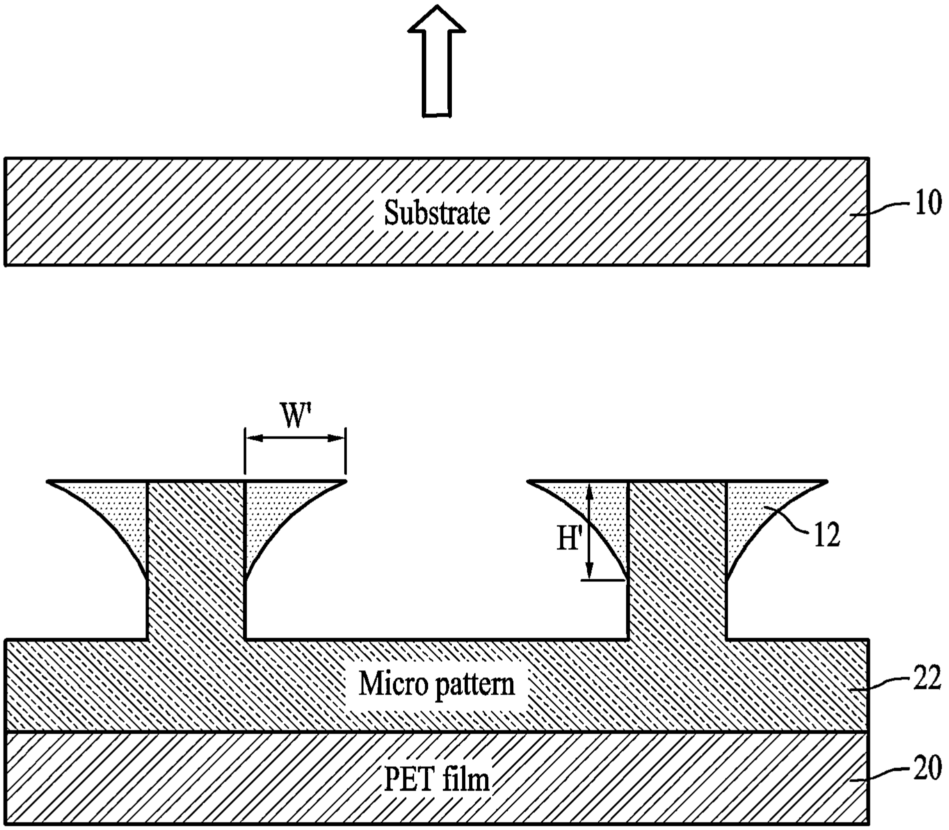

[FIG. 4A]
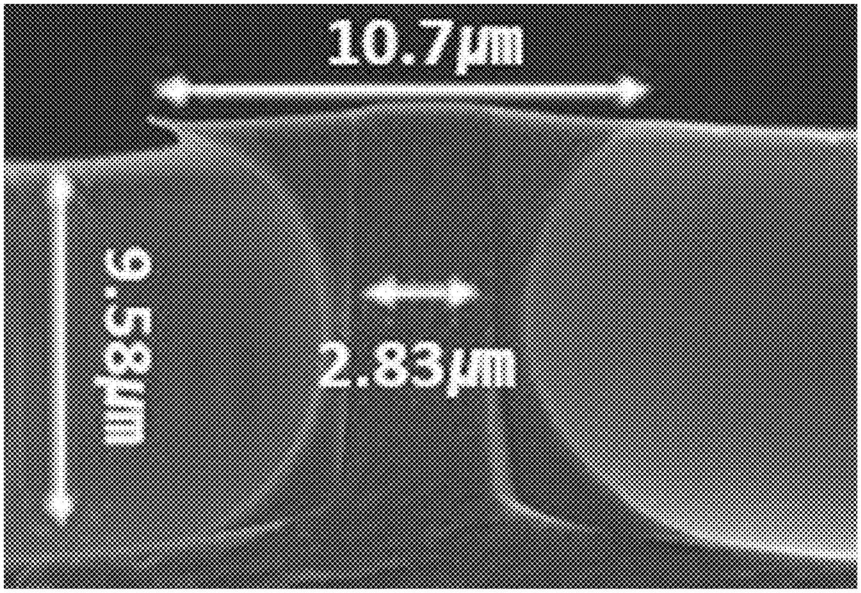

[FIG. 4B]
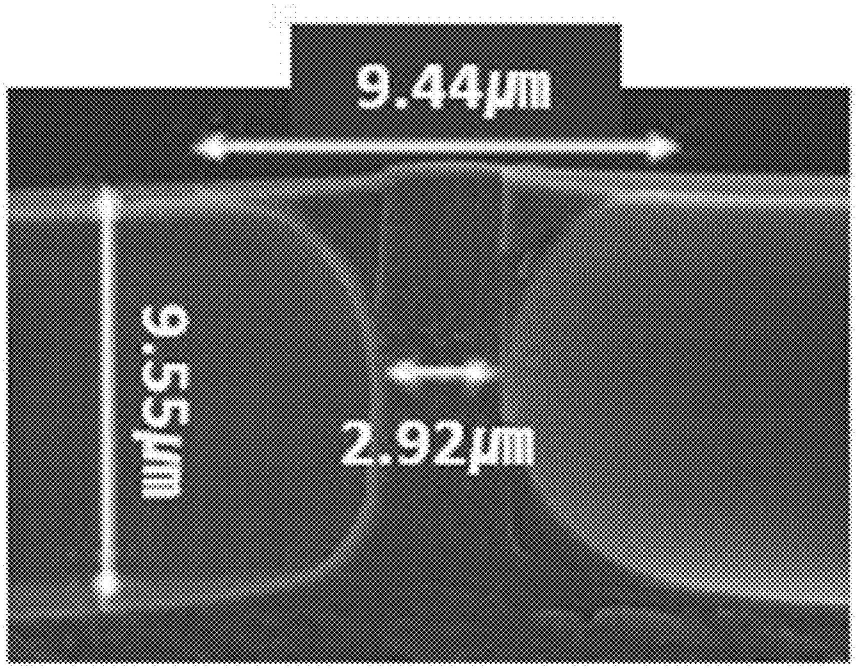

[FIG. 4C]
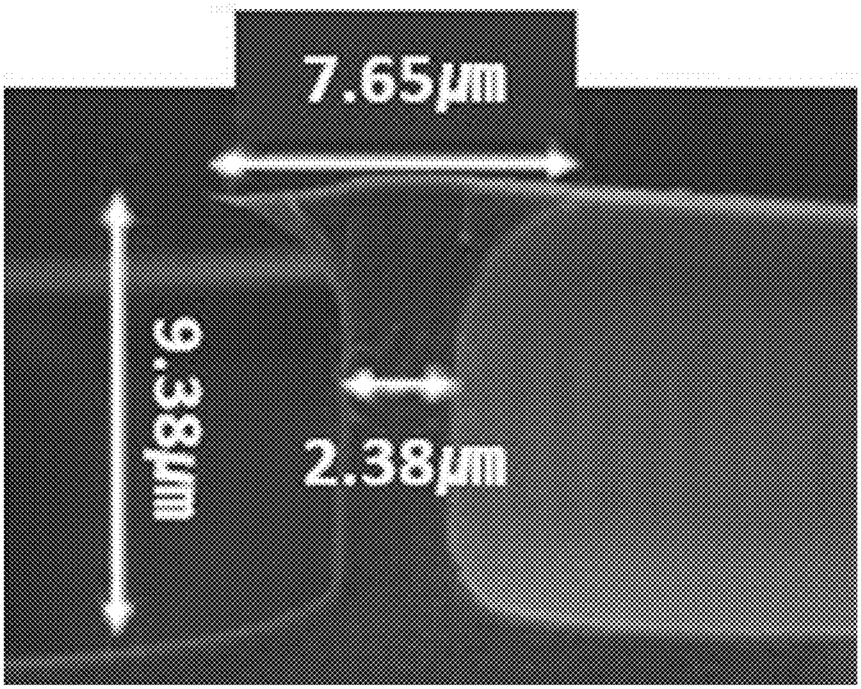

[FIG. 5A]
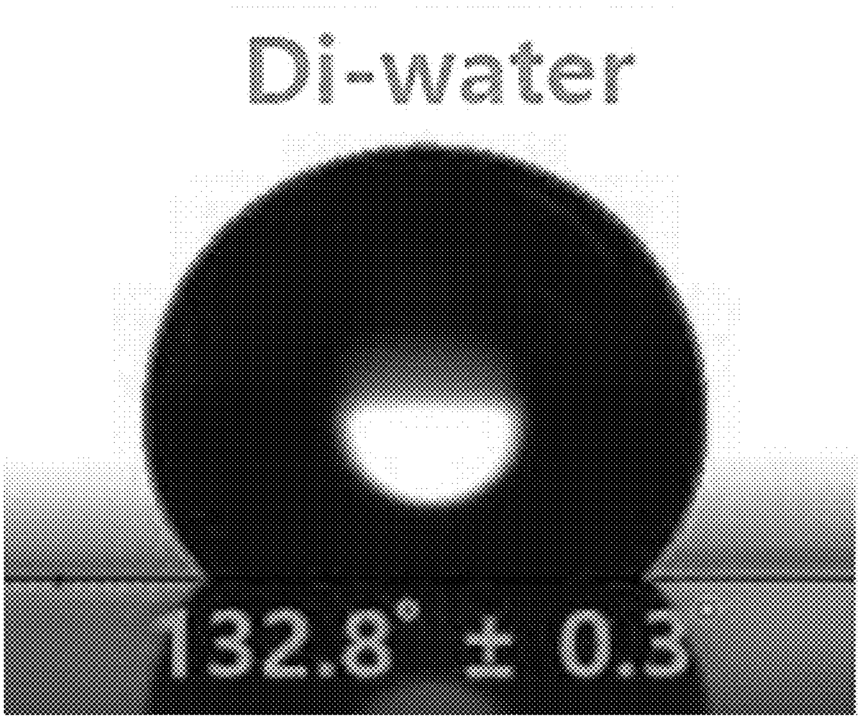

[FIG. 5B]
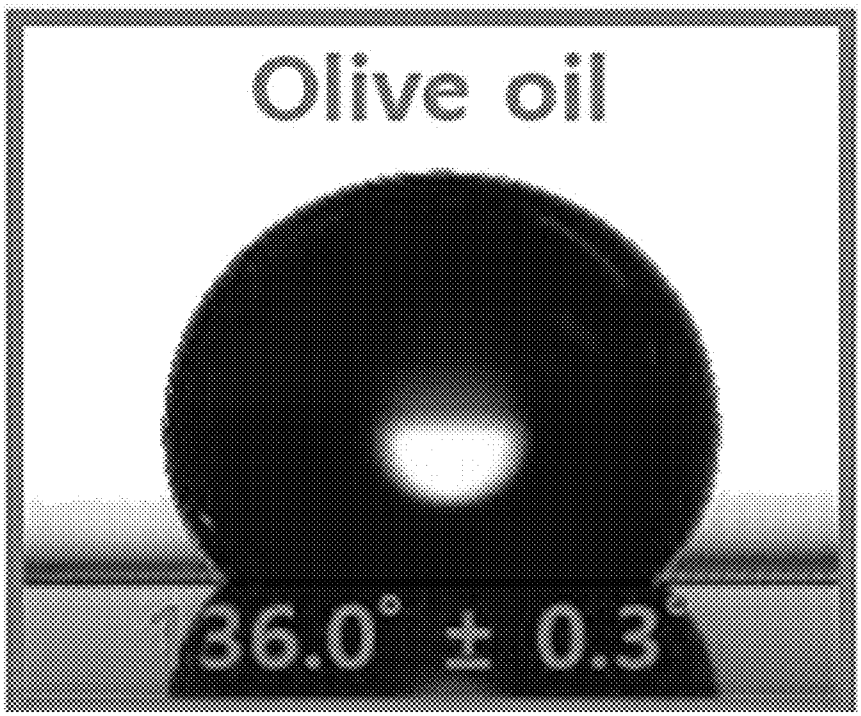

[FIG. 5C]
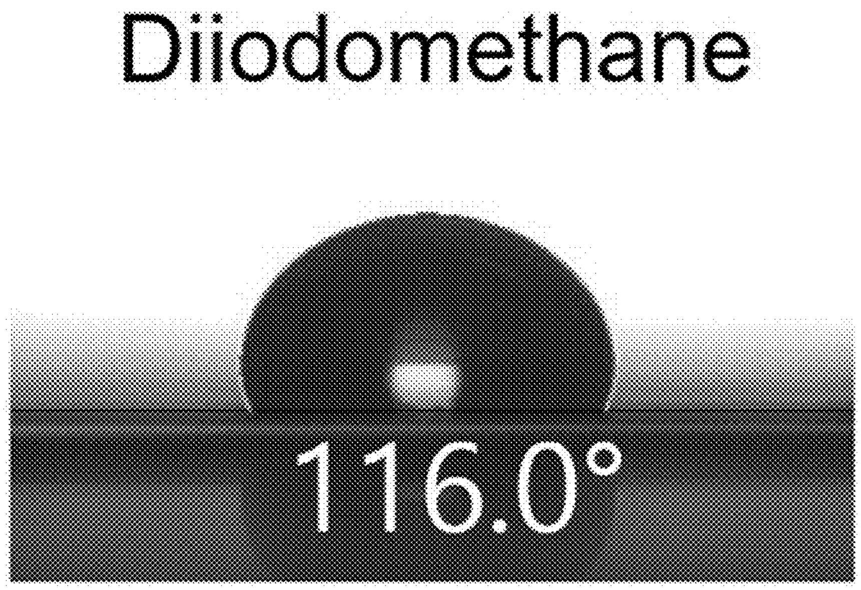

[FIG. 5D]
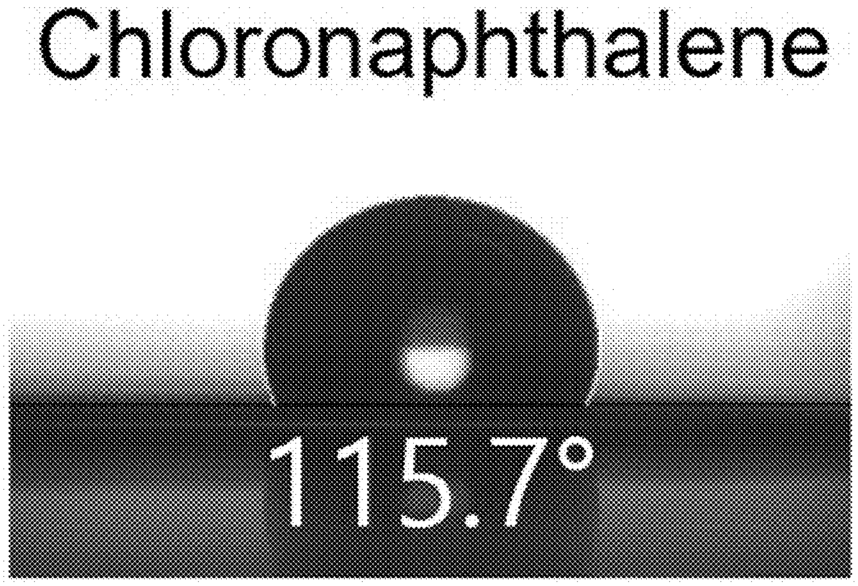

[FIG. 5E]

[FIG. 5F]
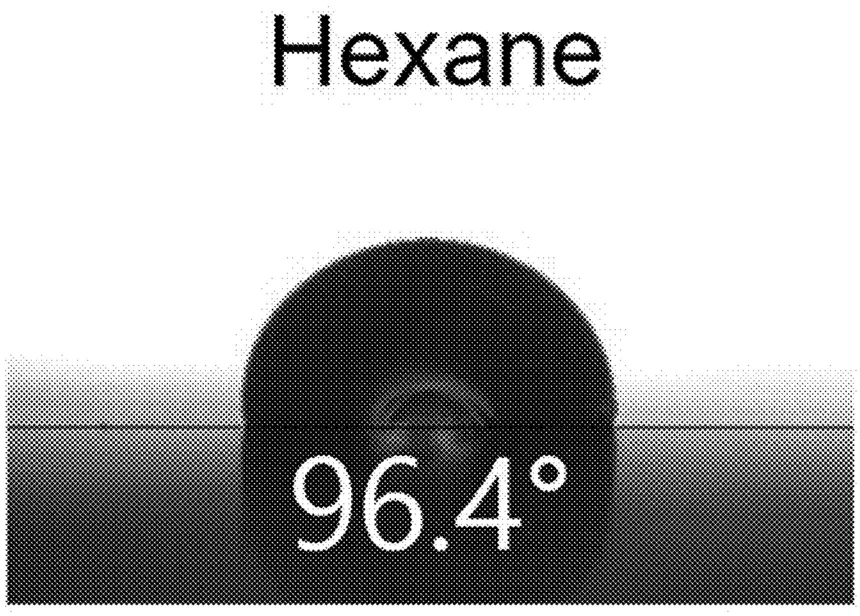

METHOD FOR MANUFACTURING OMNIPHOBIC SURFACE USING CAPILLARY FORCE

TECHNICAL FIELD

The present invention relates to a method of manufacturing an omniphobic surface using capillary force, and more particularly, to a method of manufacturing a micropattern surface with a reentrant structure with hydrophobicity and oleophobicity through a simple process using capillary force.

BACKGROUND ART

The imprint process is a technology for transferring a fine pattern to a material by press-fitting a metal mold (commonly called a mold or stamp) on which a pattern is formed. Since simple and precise fine patterns can be produced using the imprint process, the imprint process is expected to be applied in various fields in recent years.

As for the imprint process, methods called thermal imprint process and optical imprint process are proposed as the transfer method. In the thermal imprint process, a mold is pressed into a thermoplastic resin heated above the glass transition temperature, and after cooling, the mold is released to form a fine pattern. This method can select a variety of materials, but it also has the problem of requiring high pressure during pressing and making it difficult to form fine patterns due to heat shrinkage.

In the optical imprint process, a curable composition (resin) for imprint is applied on a substrate, and then a mold made of a light-transmissive material such as quartz is press-fitted. With the mold press-fitted, the curable composition for imprint is cured by irradiating ultraviolet rays, and then the mold is released to produce a cured product with a desired pattern transferred. The optical imprint process has advantages over the thermal imprint process due to fast curing time thereof when implementing ultra-fine patterns.

In addition, research on producing surfaces with special functions such as hydrophobicity, oleophobicity, anti-fouling, and anti-icing is being actively conducted based on natural description. As a representative example, nano- or micro-scale structures are created on a surface, and films with functions such as hydrophobicity and oleophobicity are produced based on structural properties. For example, a surface structure that simultaneously implements hydrophobicity and oleophobicity includes a reentrant structure or a doubly reentrant structure.

As the related art, Korean Patent No. 10-2052100 (SUPER LIQUID-REPELLENT SURFACE AND METHOD FOR MANUFACTURING THE SAME) discloses a method of manufacturing a super liquid-repellent surface by depositing a metal of a mushroom angle structure bent downward using a metal deposition method on a flat T-shaped mushroom structure patterned stretchable polymer formed by a photolithography process.

However, since the related art requires chemical surface treatment processes such as deposition, chemicals that are harmful to the human body or the environment may be used. Additionally, costs increase due to the complex manufacturing process.

DISCLOSURE

Technical Problem

Therefore, the present invention has been made in view of the above problems, and it is one object of the present invention to provide a technology capable of reducing manufacturing costs and manufacturing time by transforming a pillar-shaped fine pattern into a reentrant structure through a simple process using capillary force.

Technical Solution

In accordance with one aspect of the present invention, provided is a method of manufacturing an omniphobic surface using capillary force, the method including a step of forming a resin layer by applying an ultraviolet rays (UV) curable resin on a first substrate; a step of forming a pillar-shaped fine pattern on a second substrate; a step of bringing the resin layer and the fine pattern into contact with each other by moving the first substrate or the second substrate so that the resin layer and the fine pattern face each other; and a step of curing the resin by radiating ultraviolet rays while the resin located around a pillar of the fine pattern moves a certain distance along the pillar in a longitudinal direction of the pillar of the fine pattern by capillary force.

According to one embodiment of the present invention, the resin may be applied to a uniform thickness using a roller on the first substrate.

In addition, according to one embodiment of the present invention, the resin may be irradiated with ultraviolet rays through the transparent first substrate.

In addition, according to one embodiment of the present invention, a moving distance of the resin may be affected by a contact time between the resin layer and the fine pattern.

In addition, according to one embodiment of the present invention, as the resin approaches pillars of the fine pattern, the resin may move further along longitudinal directions of the pillars of the fine pattern.

In addition, according to one embodiment of the present invention, after the resin is cured by ultraviolet rays, a reentrant structure in which a horizontal cross-section of the pillar of the fine pattern in contact with the resin layer has a larger area than other horizontal cross-sections of the pillar may be formed.

In addition, according to one embodiment of the present invention, an amount of the resin may be adjusted so that a width of a vertical cross-section of the pillar of the fine pattern in contact with the resin layer has a preset value.

In addition, according to one embodiment of the present invention, the resin may be processed so that a width of a vertical cross-section of the pillar of the fine pattern in contact with the resin layer has a preset value.

In addition, according to one embodiment of the present invention, the method may further include a step of removing the first substrate after irradiation with ultraviolet rays is completed.

Advantageous Effects

According to the present invention, a micropattern surface (omniphobic surface) with a reentrant structure with excellent hydrophobicity and oleophobicity can be manufactured through a simple process at low cost without complicated processes such as etching.

In addition, according to the present invention, a micropattern surface with a reentrant structure can be manufactured in a short time without using chemicals harmful to humans and the environment.

In addition, according to the present invention, the moving distance (H') and width (W') of a reentrant structure can be set by considering the amount of resin applied on a first substrate and physical properties calculated for capillary force.

In addition, according to the present invention, the shape of a reentrant structure can be adjusted by setting the contact time between a resin layer and a fine pattern.

DESCRIPTION OF DRAWINGS

FIGS. 1A to 1C include diagrams showing the various structures of a fine pattern and the flow characteristics of fluid in contact with the upper part of a pattern.

FIG. 2 is a flowchart explaining the production of an omniphobic surface using capillary force according to an embodiment of the present invention.

FIGS. 3A to 3E are diagrams sequentially showing the manufacturing process of an omniphobic surface using capillary force according to an embodiment of the present invention.

FIGS. 4A to 4C are diagrams showing the deformation of a fine pattern structure depending on the contact time between a fine pattern and a resin layer.

FIGS. 5A to 5F are diagrams of measuring the contact angle by contacting various liquids with an omniphobic surface manufactured according to an embodiment of the present invention.

BEST MODE

Hereinafter, with reference to the attached drawings, a method of manufacturing an omniphobic surface using capillary force according to a preferred embodiment will be described in detail as follows. In this specification, the same or similar elements are designated by the same reference numerals. Redundant descriptions and detailed descriptions of known functions and configurations that may unnecessarily obscure the gist of the invention are omitted. These embodiments are provided to more fully describe the present invention to those skilled in the art. Accordingly, the shapes and sizes of elements in the drawings may be exaggerated for clearer explanation.

FIGS. 1A to 1C include diagrams showing the various structures of a fine pattern and the flow characteristics of fluid in contact with the upper part of a pattern.

The present invention presents a method of manufacturing a nano- or micro-scale fine pattern with a pillar shape into a roughly mushroom-shaped reentrant structure. A reentrant structure is a structure in which the upper width of a fine pattern pillar is larger than the lower width.

A fine pattern film with a reentrant structure has an omniphobic surface with hydrophobicity and oleophobicity.

The fine pattern shown in FIG. 1A has a pillar shape, the fine pattern shown in FIG. 1B has a reentrant structure, and the fine pattern shown in FIG. 1C has a doubly reentrant structure.

When liquid is brought into contact with the micropattern surface shown in FIGS. 1A to 1C, the flow of the liquid is observed. FIGS. 1A to 1C show the flow direction of liquid in contact with the micropattern surface.

Referring to FIG. 1A, when liquid comes into contact with the surface of a pillar-shaped fine pattern, the liquid may move along the pillar due to the adhesive force of the liquid. Referring to FIG. 1B or 1C, liquid that contacts a micropattern surface with a reentrant or doubly reentrant structure may not move along the pillar. In particular, it is more difficult for liquid to enter the pillar direction on a micropattern surface with a doubly reentrant structure than with a reentrant structure.

That is, as shown in FIGS. 1A to 1C, it can be seen that a fine pattern with a reentrant structure or a doubly reentrant structure has excellent hydrophobicity or oleophobicity when exposed to liquid.

Conventionally, complex processes such as etching, deposition, and coating were required to form a fine patterned reentrant structure. However, these processes increase manufacturing costs and have a harmful effect on the human body due to the chemical treatment processes. The present invention provides a method of forming a fine pattern with a reentrant structure in a short time while reducing manufacturing costs through a simple process.

FIG. 2 is a flowchart explaining the production of an omniphobic surface using capillary force according to an embodiment of the present invention, and FIGS. 3A to 3E are diagrams sequentially showing the manufacturing process of an omniphobic surface using capillary force according to an embodiment of the present invention.

Referring to FIG. 2, the method of manufacturing an omniphobic surface using capillary force according to an embodiment of the present invention includes step S100 of forming a resin layer on a first substrate, step S200 of forming a fine pattern on a second substrate, step S300 of contacting the resin layer and the fine pattern, step S400 of radiating ultraviolet rays, and step S500 of removing the first substrate.

First, step S100 of forming a resin layer on a first substrate is described. Referring to the upper drawing of FIG. 3A, a first substrate 10 is made of a transparent material that allows ultraviolet rays to pass through. A resin 12 is applied on top of the first substrate 10.

The resin 12 is a photocurable polymer resin that causes physical and chemical changes through light energy. The resin 12 applied on the first substrate 10 is in a flowable state (possible to flow).

The resin 12 is applied to a uniform thickness by a roller. Accordingly, a resin layer is formed on the first substrate 10. In addition, when the resin 12 may be applied to a uniform thickness on the first substrate 10, various methods such as discharge by an ejection device or spin coating may be used.

Next, step S200 of forming a fine pattern on a second substrate is described. As shown in the lower drawing of FIG. 3A, a fine pattern 22 with irregularities is formed on a second substrate 20. The substrate used in one embodiment of the present invention is a polyethylene terephthalate (PET) film, but the present invention is not limited thereto. The fine pattern has a nano or micro size. Various lithography techniques may be used to form the fine pattern 22.

In one embodiment of the present invention, a fine pattern was formed using nano imprint lithography technology. Nano imprint is a technology that can imprint nano-scale patterns like a stamp. According to this technology, an imprint resin is applied on the second substrate 20 on which a pattern is to be created, imprinting is performed by pressing the substrate with a stamp designed with a desired pattern, and then a predetermined layer is patterned by dry or wet etching.

As in the lower drawing in FIG. 3A, the fine pattern formed by nano imprint technology has a pillar shape in the vertical cross-section thereof. At this time, the width (or horizontal cross-section) of the pillar is approximately constant according to the height.

The produced fine pattern may be an array pattern with a polygonal or cylindrical shape or an array pattern with a polygonal or circular wall-pillar shape when viewed from above, and the shape of the fine pattern may be set in various ways depending on the designer's intention.

Next, step S300 of contacting the resin layer and the fine pattern is described. As shown in FIG. 3B, the first substrate 10 is located below and the second substrate 20 is located above. At this time, after the resin layer and the fine pattern 22 face each other, the first substrate 10 is moved downward until the resin layer and the fine pattern 22 come into contact.

When the resin layer and the fine pattern 22 come into contact, the resin 12 located around the pillars of the fine pattern becomes wet as the resin 12 touches the pillars. Accordingly, as shown in FIG. 3C, the resin 12 moves along the pillars in the longitudinal direction of the pillars by capillary force (pillar force). At this time, the height of the liquid (resin in the present invention) that rises along the pillars by the capillary force may be calculated by Equation 1 below.

$$H = \frac{2\gamma\cos\theta}{\rho GL} \qquad \langle\text{Equation 1}\rangle$$

Here, H represents the maximum height moved in the longitudinal direction of the pillars, $\gamma$ represents the surface tension between the resin/air interface, $\theta$ represents the contact angle between the resin and the pillars, $\rho$ represents the density of the resin, G represents the gravitational constant, and L represents the distance between pillars.

As shown in FIG. 3C, when the resin 12 located between the two pillars of the fine pattern 22 moves by capillary force, a concave meniscus appears along the boundary of the resin 12. That is, the resin 12 located close to the pillars moves significantly in the longitudinal direction of the pillars, increasing the thickness of the resin 12. As the resin 12 located between both pillars moves toward the pillars, the thickness thereof decreases. Based on one pillar, the resin 12 located on both sides of the pillar moves along the pillar while forming an approximate mushroom shape, and the fine pattern 22 forms a reentrant structure.

A reentrant structure is a structure in which the upper pillar cross-section (horizontal cross-section) in contact between the resin layer and the fine pattern has a larger area than the lower cross-section (horizontal cross-section) of the pillar, or the upper width is wider than the lower width.

To form the fine pattern 22 with a reentrant structure, the distance that the resin 12 moves along the pillar is important. For example, when the resin 12 moves too far, the overall shape of the pillar may have a hyperbola shape (see FIGS. 4A and 4B). Accordingly, in this specification, the moving distance of the resin 12 to form a reentrant structure is referred to as H'.

As mentioned above, the moving distance of the resin 12 is calculated by Equation 1. When the H value is greater than the H' value, the moving distance of the resin is affected by the contact time between the resin layer and the fine pattern 22. That is, as the contact time increases, the resin 12 moves further along the pillar and a reentrant structure may not be formed. Accordingly, an appropriate contact time is required, which will be described later.

Next, step S400 of radiating ultraviolet rays (UV) is described. As shown in FIG. 3D, when the resin layer and the fine pattern 22 are in contact and the resin 12 moves along the pillar as much as H', the transparent first substrate 10 is irradiated with ultraviolet rays to harden the resin 12.

Next, step S500 of removing the first substrate is described. As shown in FIG. 3E, when the curing of the resin 12 is complete, the first substrate 10 is removed. At this time, the width of a reentrant structure formed on one side of the pillar is referred to as W'. As shown in FIG. 3E, after removing the first substrate 10, the amount of resin applied to the first substrate 10 in step S100 may be adjusted so that the width of the reentrant structure becomes W'. However, according to a modified embodiment, when the resin 12 between both pillars remains attached after removing the first substrate 10, processing may be performed using methods such as cutting so that the width of the reentrant structure is W'.

In addition, according to another embodiment of the present invention, in steps S100 to S500, the first substrate 10 on which the resin layer is formed may be located below, and the second substrate 20 may be located above. In this case, the principle of the resin 12 moving along the pillar is the same, and irradiation with ultraviolet rays in step S400 is performed from bottom to top.

FIGS. 4A to 4C are diagrams showing the deformation of a fine pattern structure depending on the contact time between a fine pattern and a resin layer.

Referring to FIGS. 4A to 4C, the present inventors performed steps S100 to S500 described above to produce a fine pattern with a reentrant structure. At this time, other conditions were the same, and while changing the contact time between the resin layer and the fine pattern 22, it was observed through a scanning electron microscope (SEM) whether the reentrant structure intended by the inventors was formed.

FIG. 4A shows a fine pattern structure produced when the contact time between the resin layer and the fine pattern was 30 seconds, FIG. 4B shows a fine pattern structure produced when the contact time between the resin layer and the fine pattern was 10 seconds, and FIG. 4C shows a fine pattern structure produced when the contact time between the resin layer and the fine pattern was 5 seconds.

As shown in FIG. 4A, when the contact time was 30 seconds, the upper width was 10.7 μm, and hyperbola structures appeared on both sides of the pillar. As shown in FIG. 4B, when the contact time was 10 seconds, the upper width was 9.44 μm, and hyperbola structures appeared on both sides of the pillar. As shown in FIG. 4C, when the contact time was 5 seconds, the upper width was 7.65 μm, and a reentrant structure appeared where the upper width was larger than the lower width. That is, according to this experiment, when the contact time is short, a reentrant structure appears.

However, as mentioned above, the contact time may be set considering each physical property in Equation 1, the amount of resin applied, the moving distance (H') of the resin to form a reentrant structure, etc.

FIGS. 5A to 5F are diagrams of measuring the contact angle by contacting various liquids with an omniphobic surface manufactured according to an embodiment of the present invention.

Hydrophobicity refers to a state in which the contact angle between a micropattern surface and water droplet exceeds 90° (hydrophobicity standard contact angle), and super hydrophobicity means a state in which the contact angle between a micropattern surface and water droplet exceeds 150° (super hydrophobicity standard contact angle). In addition, oleophobicity refers to a state in which the contact angle between a micropattern surface and oil exceeds 90° (oleophobicity standard contact angle), and super oleophobicity refers to a state in which the contact angle between a micropattern surface and oil exceeds 150° (super oleophobicity standard contact angle).

Referring to FIGS. 5A and 5B, the present inventors measured the contact angle by contacting water (Di-water) and oil (olive oil) on a micropattern surface with a reentrant structure shown in FIG. 4C.

As shown in FIG. 5A, the contact angle between the fine pattern and water was 132.8°±0.3°, confirming excellent hydrophobicity. As shown in FIG. 5B, the contact angle between the fine pattern and oil was 136.0°±0.3°, confirming excellent oleophobicity. That is, hydrophobicity and oleophobicity are related to whether the reentrant structure is properly formed, and it can be seen that this is also affected by the contact time between the resin layer and the fine pattern during the manufacturing process of the present invention.

Referring to FIGS. 5C to 5F, existing materials such as diiodomethane (44.0 mN/m), chloronaphthalene (38.3 mN/m), and silicone oil (19.5 mN/m) with low surface tension that have difficulty in possessing liquid-repellent properties have a contact angle of about 1150 and exhibit liquid-repellent properties. In particular, hexane, which is volatile and has a very low surface tension, also has a contact angle of about 96° and exhibits liquid-repellent properties. Based on these results, it can be confirmed that the present invention provides an omniphobic surface structure with liquid-repellent properties for various liquids.

The present invention has been described with reference to an embodiment shown in the attached drawings, but this is merely illustrative. Those skilled in the art will understand that various modifications and other equivalent embodiments are possible. Therefore, the true scope of protection of the present invention should be determined only by the scope of the attached claims.

The invention claimed is:

1. A method of manufacturing an omniphobic surface using capillary force, the method comprising:

a step of forming a resin layer by applying an ultraviolet rays (UV) curable resin on a first substrate;

a step of forming a pillar-shaped fine pattern on a second substrate;

a step of bringing the resin layer and the fine pattern into contact with each other by moving the first substrate or the second substrate so that the resin layer and the fine pattern face each other; and a step of curing the resin by radiating ultraviolet rays while the resin located around a pillar of the fine pattern moves a certain distance along the pillar in a longitudinal direction of the pillar of the fine pattern by capillary force, wherein, after the resin is cured by ultraviolet rays, a reentrant structure in which a horizontal cross-section of the pillar of the fine pattern in contact with the resin layer has a larger area than other horizontal cross-sections of the pillar is formed.

2. The method according to claim 1, wherein the resin is applied to a uniform thickness using a roller on the first substrate.

3. The method according to claim 1, wherein the resin is irradiated with ultraviolet rays through the transparent first substrate.

4. The method according to claim 1, wherein a moving distance of the resin is affected by a contact time between the resin layer and the fine pattern.

5. The method according to claim 1, wherein, as the resin approaches pillars of the fine pattern, the resin moves further along longitudinal directions of the pillars of the fine pattern.

6. The method according to claim 1, wherein an amount of the resin is adjusted so that a width of a vertical cross-section of the pillar of the fine pattern in contact with the resin layer has a preset value.

7. The method according to claim 1, wherein the resin is processed so that a width of a vertical cross-section of the pillar of the fine pattern in contact with the resin layer has a preset value.

8. The method according to claim 1, further comprising a step of removing the first substrate after irradiation with ultraviolet rays is completed.

* * * * *